United States Patent [19]

Grassl

[11] Patent Number: 4,684,100
[45] Date of Patent: Aug. 4, 1987

[54] SPRUNG VEHICLE SEAT

[75] Inventor: Johann Grassl, Schwandorf, Fed. Rep. of Germany

[73] Assignee: Grammer Sitzsysteme GmbH, Amberg, Fed. Rep. of Germany

[21] Appl. No.: 855,476

[22] Filed: Apr. 24, 1986

[30] Foreign Application Priority Data

May 15, 1985 [DE] Fed. Rep. of Germany ....... 3517504

[51] Int. Cl.[4] ............................................. F16M 13/00
[52] U.S. Cl. .................................... 248/550; 248/588; 248/631
[58] Field of Search ............... 248/550, 563, 631, 636, 248/567, 564, 562, 588; 267/114, 117; 180/282; 297/345, 347, 339

[56] References Cited

U.S. PATENT DOCUMENTS

| | | | |
|---|---|---|---|
| 2,202,158 | 5/1940 | Lidseen | 248/422 X |
| 3,341,165 | 9/1967 | Taylor | 248/550 |
| 3,632,077 | 1/1972 | Hall | 297/345 X |
| 3,638,897 | 2/1972 | Harder | 297/345 X |
| 3,951,373 | 4/1976 | Swenson | 248/631 X |
| 4,213,594 | 7/1980 | Pietsch | 248/631 X |
| 4,379,539 | 4/1983 | Rion | 248/422 X |
| 4,556,185 | 12/1985 | Takagi | 248/422 X |

Primary Examiner—J. Franklin Foss
Attorney, Agent, or Firm—Elliot M. Olstein

[57] ABSTRACT

A sprung vehicle seat comprises a fluid spring between a base frame and a seat carrier frame displaceable relative to the base frame in respect of height, together with a control means for the fluid spring. The control means includes a switching means and an actuator acting thereon, with movement in respect of height of the seat carrier frame relative to the base frame being converted into a relatively large rotary movement as between the switching means and the actuator means. The structure for converting the heightwise movement into the rotary movement includes a belt winding mechanism wherein extension and retraction of the belt in response to heightwise movement of the seat carrier frame produces the relative rotary movement, or a toothed element meshing with a gear similarly operable to provide the relative rotary movement of substantial magnitude.

2 Claims, 4 Drawing Figures

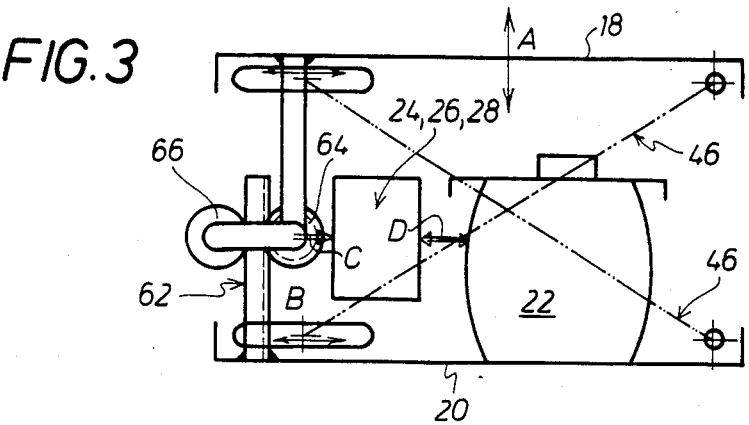
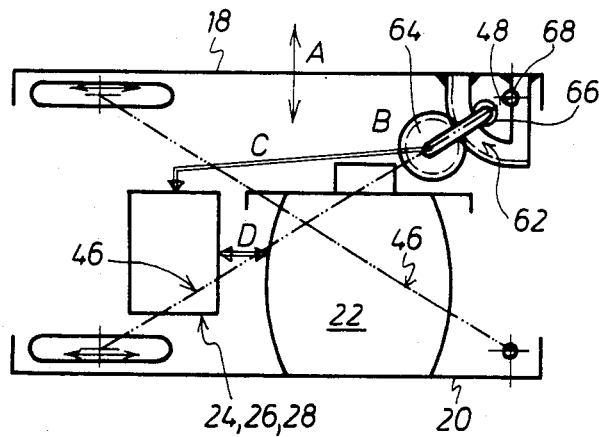
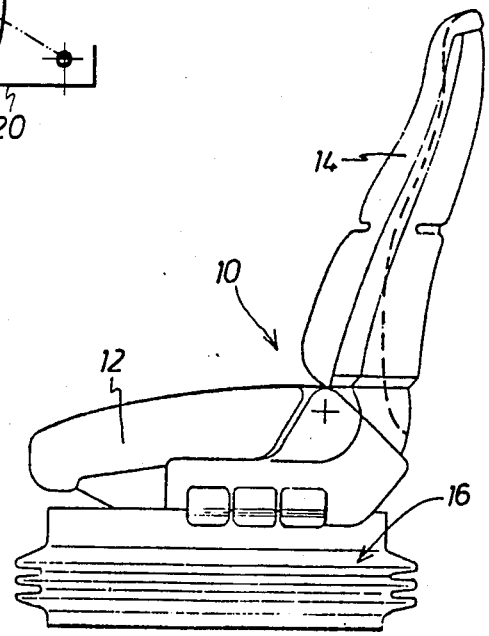

SPRUNG VEHICLE SEAT

BACKGROUND OF THE INVENTION

One form of sprung vehicle seat, as disclosed for example in U.S. Pat. No. 4,484,723, comprises a base frame and a seat carrier frame which is displaceable relative thereto, with a fluid spring disposed between the two frames. The seat construction includes a control means for controlling the fluid spring, including a switching means and a sender or actuator which is operable to act on the switching means, to vary the pressure in the fluid spring. Movements in respect of height of the seat carrier frame relative to the base frame are converted into a relative rotary movement between the switching means and the actuator. The switching means for altering the pressure in the fluid spring comprises two stitches and the actuator which operates the switching means is in the form of a control spool. Each of the two stitch devices has two actuating stages wherein during a pivotal movement of the spool the first actuating stage initially acts as an idle stage and a switching operation is produced only in the subsequent second actuating stage. In the decreasing actuation mode, the switch which has been switched on remains in that condition until both actuating stages have been traversed. For that purpose the control spool has two control portions wherein, in both directions of pivotal movement of the spool, it is firstly the first control portion which puts the respective operable switch into the first actuating stage that comes into operation and it is only upon further movement in the same direction that the second control portion which moves the respective switch into the second actuating stage comes into effect.

In that vehicle seat structure, the control arrangement performs only a relatively small angular movement during a movement in respect of height of the seat carrier frame relative to the base frame, so that the relative rotary movement between the switching means and the actuator in the form of the control spool member is relatively small. As a result of that comparatively slight rotary movement, the various switching operations must be carried out within the relatively small angle of pivotal motion of the actuator.

German laid-open application (DE-OS) No. 30 43 177 discloses a sprung vehicle seat in which the seat carrier frame is supported on a base frame by way of guide levers, with an interposed fluid spring. The control means for adjusting the pressure in the fluid spring is associated with one of the two frames. In that vehicle seat design also the control means has a switching means and an actuator for actuating same. The switching means comprises two switch devices and the actuator is in the form of a slide member. The actuator is arranged displaceably on the seat carrier frame and has two flanks or side surfaces which, in the event of heightwise motion of the carrier frame relative to the base frame, come into operative co-operation with one switch device or the other so that the pressure in the fluid spring is either increased or reduced. In that construction, the linear displacement of the actuator, being dependent on the movement in respect of height of the seat carrier frame relative to the base frame, is comparatively slight so that the control arrangement must also be of a precise design so that it can operate with a good degree of accuracy.

BACKGROUND OF THE INVENTION

An object of the present invention is to provide a sprung vehicle seat adapted to provide height adjustment, which is of a compact and reliable operating structure.

Yet another object of the present invention is to provide a sprung vehicle seat which provides for adjustment in respect of height with a substantial level of sensitivity.

Still another object of the present invention is to provide a sprung vehicle seat which, while providing for adjustment in respect of height, does not require the use of control arrangements which are of a precision construction and highly accurate in operation.

A further object of the present invention is to provide a sprung vehicle seat structure which is reliable in operation and also of a compact and aesthetically attractive construction in regard to external appearance.

In accordance with the present invention, these and other objects are achieved in a first aspect by a sprung vehicle seat comprising a base frame, a seat carrier frame which is displaceable relative thereto for adjustment in respect of height in relation thereto, and a fluid spring disposed between the base frame and the seat carrier frame. A control means provides for controlling the pressure in the fluid spring, comprising a switching or valve means and an actuator which is adapted to operate the valve means, the movments in respect of height of the seat carrier frame relative to the base frame being converted into a relative rotary movement as between the valve means and the actuator. A belt winding mechanism is disposed on one of the base and seat carrier frames and includes a belt having first and seconds ends, the first end of the belt being secured to the belt winding mechanism and being windable thereon and the second end of the belt being secured to the other of the base and seat carrier frames. The control means for controlling the fluid spring co-operates with the belt winding mechanism to produce the relative rotary movement as between the valve means and the actuator.

By virtue of the provision of such a belt which has one end thereof secured to the belt winding mechanism so that the belt can be wound thereon and which has its other end secured to the other frame which is remote from the belt winding mechanism, whereby the belt is wound on to and off the belt winding mechanism as the frame to which the second end of the belt is secured moves towards and away from the belt winding mechanism, it is readily possible for any heightwise movement of the seat carrier frame relative to the base frame to be converted into a rotary movement of the belt winding mechanism, the angle of rotation thereof in dependence on the heightwise movement of the seat carrier frame being relatively substantial. As a result of that relatively large angle of rotary movement between the valve means and the actuator, the control means operates in a highly accurate fashion. In an advantageous embodiment of this structure in accordance with the present invention the actuator comprises a cam shaft and the valve means operates with thrust members which co-operate with cam means on the cam shaft, to adjust the fluid spring pressure.

A vehicle seat in accordance with the present invention as set forth above also has the advantage that the belt which has its first end secured to the belt winding mechanism and by way thereof to one of the base and seat carrier frames and which has its other end secured to the other of the frames acts as a secondary belt in the event of an accident or violent deceleration of the vehicle in which the vehicle seat is fitted. In that way there is no need for a further belt to be provided between the seat carrier frame and the base frame, such further belt often being arranged outside the seat and thus detrimentally affecting the appearance of the seat.

In accordance with a further aspect of the teaching of the present invention the foregoing and other objects may be achieved by a sprung vehicle seat comprising a base frame, a seat carrier frame movable substantially vertically relative thereto and a fluid spring operatively disposed between the base frame and the seat carrier frame, together with a control means for controlling the fluid spring. The control means comprises a switching or valve means and an actuator adapted to operate the valve means thereby to vary the pressure in the fluid spring, the movement in respect of height of the seat carrier frame relative to the base frame being converted into a relative rotary movement as between the valve means and the actuator. A toothed element is secured to one of the base and seat carrier frames, while a gear secured to the other of the frames meshes with the toothed element. The control means co-operates with the gear to produce the relative rotary movement as between the valve means and the actuator.

In an advantageous embodiment of this construction, the toothed element may be in the form of a toothed rack member or it may comprise a tooth arrangement disposed on a circular arc configuration. When the toothed element is in the form of a toothed rack member, it is arranged between the seat carrier frame and the base frame along the line of relative movement therebetween, that is to say, generally vertically, and it is secured to one of the two frames. The overall length of the toothed rack member is less than the minimum possible height between the base frame and the seat carrier frame, that is to say when the seat is in its lowest adjusted position. The diameter of the gear which meshes with the toothed rack member is of the order of magnitude of a third of the maximum spring travel that the seat carrier frame covers in relation to the base frame when occupants of different weights use the sprung seat. That design configuration provides a comparatively large rotary movement of the gear, in dependence on the heightwise movement of the seat carrier frame, and thus a comparatively large relative rotary movement as between the valve means and the actuator. The maximum amount of rotary movement is preferably in the region of around 270°. A correspondingly large rotary movement is also possible when using a gear which meshes with a toothed element comprising a tooth arrangement disposed on a circular arc. By suitably selecting the diameter of the gear which is arranged for example on one leg or limb member of a scissor-type support arrangement which is pivotable between the seat carrier frame and the base frame, it is also possible for a heightwise movement of the seat carrier frame to be converted into a comparatively substantial angle of rotary movement of the gear. In a vehicle seat, the toothed element, with the tooth arrangement on a circular arc thereon, is arranged in the vicinity of a limb member of the scissor-type support arrangement, which is pivotable about a fixed point, the arrangement being such that the centre point of the arc on which the tooth arrangement of the toothed element lies corresponds to the above-mentioned fixed point.

So that the toothed element in the form of a rack member or in the form of a segment of a tooth arrangement which follows an arcuate configuration and the gear which meshes with the toothed element so-to-speak perform the function of a secondary belt, the toothed element may be provided with an oppositely disposed surface which extends parallel to the tooth arrangement and against which bears a support means which engages around the toothed element and which is mechanically fixedly connected to the gear. The support means may be for example a roller or wheel or like rotary member which rolls against the back of the toothed element, that is to say, against the side thereof remote from the side carrying the tooth arrangement.

Further objects, features and advantages of the construction in accordance with the present invention will become apparent from the following description of preferred embodiments thereof.

BRIEF DESCRIPTION OF THE DRAWINGS

FIG. 1 is a side view of a sprung vehicle seat,

FIG. 3 is a diagrammatic view of major parts of a sprung vehicle seat, wherein the belt winding mechanism and the belt are replaced by a toothed rack and a gear and the control means is indicated diagrammatically by a circuitry block, and FIG. 4 is a view corresponding to that shown in FIG. 3 of major parts of a sprung vehicle seat wherein the toothed rack member has been replaced by a toothed element having a tooth arrangement of an arcuate configuration.

DESCRIPTION OF THE PREFERRED EMBODIMENTS

Figure 2:
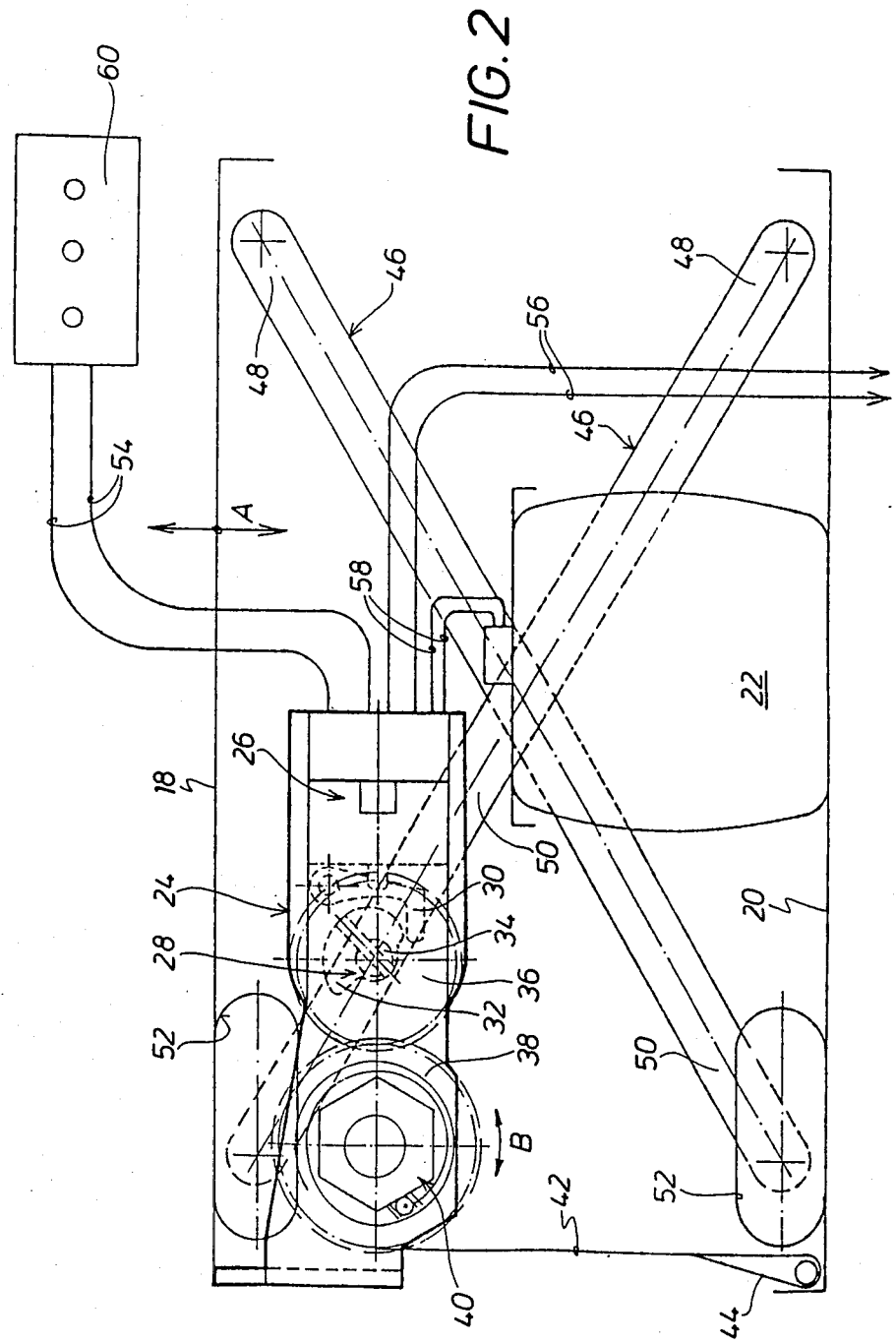
FIG. 2 is a diagrammatic side view of major parts of the vehicle seat shown in FIG. 1, comprising the seat carrier frame, the base frame, the control means, the fluid spring and a belt winding mechanism.

Referring firstly to FIG. 1, shown therein is a side view of a sprung vehicle seat 10 comprising a seat portion 12 and a backrest portion 14. The seat portion 12 is carried on a support arrangement 16 comprising a seat carrier frame (referenced at 18 in FIG. 2), a base frame (referenced at 20 in FIG. 2), a fluid spring (referenced at 22 in FIG. 2) and a control means (referenced at 24 in FIG. 2) for the fluid spring.

Referring now more specifically to FIG. 2, the seat carrier frame 18, the base frame 20 and the fluid spring 22 are shown diagrammatically therein. The fluid spring 22 is usually a gas spring. FIG. 2 also shows a control means 24 for the fluid spring 22, for varying the fluid pressure in the fluid spring. The control means 24 comprises a switching or valve means 26 and an actuator 28 for actuating the means 26. The valve means 26 is provided with thrust members 30 which are in the form of valve push or tappet members. The actuator 28 has cams 32 which are provided on a shaft 34 which in turn is connected to a gear 36 meshing with a further gear 38. The gear 38 is connected to a belt winding or retractor mechanism 40. The cams 32 on the cam shaft 34 co-operate with the members 30 for valve actuation purposes, as will be described hereinafter.

A heightwise movement of the seat carrier frame 18 relative to the base frame 20, as indicated by a double-headed arrow A in FIG. 2, is converted into a relative rotary movement as between the valve means 26 and the actuator 28. The relative rotary movement is indicated by the double-headed arrow B in FIG. 2.

The mechanism 40 is carried on one of the seat carrier and base frames 18 and 20 respectively of the vehicle seat 10, being secured in the structure illustrated in FIG. 2 to the seat carrier frame 18. The belt winding mechanism 40 comprises a flexible belt 42 having a first end thereof secured to and thus windable on to the mechanism 40 while the second end 44 of the belt 42 is secured to the other frame 20. It will be appreciated that it is alternatively possible for the mechanism 40 to be mounted on the base frame 20 with the second end 44 of the belt 44 correspondingly connected to the seat carrier frame 18. At any event, the belt 42, in conjunction with its associated structure, not only provides an arrangement which is suitable for converting the heightwise movement of the seat carrier frame 18 into a relatively large rotary movement, but at the same time it affords a secondary belt for mechanically securely connecting the seat carrier frame 18 to the base frame 20. The action of the belt 42 as a secondary belt is necessary in order to achieve a high level of traffic safety if the scissor-type support arrangement 46 which is provided between the two frames 18 and 20 is not of a sufficient level of mechanical strength for mechanically securely connecting the seat carrier frame 18 to the base frame 20, in particular when the structure is subjected to very high deceleration forces as may occur in the event of a traffic accident.

Between the seat carrier frame 18 and the base frame 20 the vehicle seat 10 comprises two scissor-type support arrangements 46 of which only one is visible in the side view of the structure illustrated in FIG. 2. Each support arrangement 46 has limb portions 48 thereof mounted pivotally about fixed points on the seat carrier frame 18 and the base frame 20 respectively. The limb portions 50 which are in opposite relationship to the first-mentioned limb portions 48, in each support arrangement 46, are displaceable linearly relative to the seat carrier frame 18 and the base frame 20 respectively. Oval guide means 52 indicated in FIG. 2 represent the linear displaceability of the ends of the limb portions 50. In FIG. 2, reference numerals 54, 56 and 58 denote conduits for the fluid for the fluid spring while reference numeral 60 denotes a control valve for adjustment of the vehicle seat in respect of height.

The mode of operation of the control means 24 for the fluid spring 22 is as described by way of example in co-pending patent application U.S. Ser. No. 06/855,438, the content of which is hereby incorporated by reference herein.

Reference will now be made to FIG. 3 showing a diagrammatic side view of major components of a vehicle seat having a fluid spring 22 operatively disposed between a seat carrier frame 18 and a base frame 20. The two frames 18 and 20 are connected together, for relative movement therebetween, by means of a scissor-type support arrangement as indicated at 46. The control means 24 for the fluid spring 22, which, for the purposes of varying the pressure in the fluid spring 22, comprises a switching or valve means 26 and an actuator 28 for actuating same, is indicated by a circuitry block in FIG. 3. This construction of a vehicle seat according to the invention also provides that the heightwise movement of the seat carrier frame 18, as indicated by a double-headed arrow A, is converted into a relative rotary movement as between the valve means 26 and the actuator 28. That rotary movement is again indicated by a double-headed arrow B in FIG. 3. In this embodiment, secured to the base frame 20 of the vehicle seat support structure is a toothed element 62 which is in the form of a rack member. A gear 64 which is carried on the seat carrier frame 18 meshes with the tooth arrangement of the toothed element 62. The effect of the rotary movement of the gear 64 in the direction of the double-headed arrow B on the control means 24 is indicated by the arrow C. The double-headed arrow D denotes the action of the control means 24 on the fluid spring 22.

Disposed on the side of the rack member 62, which is in opposite relationship to the teeth thereof, is a roller 66 which thus bears against the back surface of the rack member 62 and which is connected to the gear 64 around the rack member 62.

The rack member 62 which is fixedly connected to the base frame 20 and the gear 64 connected to the seat carrier frame 18, with the roller 66, thus virtually perform the function of a secondary belt as between the seat carrier frame 18 and the base frame 20, as referred to hereinbefore. The FIG. 3 construction of the vehicle seat according to the invention also provides that a movement of the seat carrier frame 18 in respect of height, in the direction indicated by the double-headed arrow A, is converted into a comparatively large angular movement at the control means 24.

Reference is now made to FIG. 4 showing a diagrammatic side view substantially corresponding to that shown in FIG. 3, with the same components as those appearing in FIG. 3 being denoted by the same reference numerals. The FIG. 4 structure differs from the embodiment shown in FIG. 3 only insofar as the toothed element 62 comprises a tooth arrangement which is disposed in an arcuate configuration and which meshes with a gear 64. The centre point of the arcuate curvature of the toothed element 62 lies at the fixed or pivot point 68 of the lever portion 48 of the support arrangement 46. That ensures that the gear 64 meshes with the arcuate toothed element 62 in any heightwise setting of the seat carrier frame 18 relative to the base frame 20. A roller 66 bears against the back surface of the arcuately curved element 62, being the surface which is in opposite relationship to the teeth of the arcuate toothed element 62, while the roller 66 is once again connected to the gear 64 around the arcuate element 62.

By suitable selection of the diameter of the gear 64, the illustrated arrangement provides a step-up transmission effect between the angle of the limb portion of the support arrangement 46 and the angle of rotation of the gear 64 so that any heightwise movement of the seat carrier frame 18 in the direction indicated by the double-headed arrow A is converted into a relatively substantial rotary movement, as indicated by the double-headed arrow B, between the valve means 26 and the actuator 28.

It will be appreciated that the foregoing constructions were described solely by way of example of the principles of the present invention and that other modifications and alterations may be made therein without thereby departing from the spirit and scope of the present invention. For example, a further development of the present invention provides a construction having a drag mechanism for weight adjustment of a vehicle seat with varying damping performance at different heights in respect of the vehicle seat.

I claim:

1. A sprung vehicle seat comprising: a base frame; a seat carrier frame displaceable relative thereto; a fluid spring operatively disposed between the base frame and the seat carrier frame; a control means for controlling the fluid spring, said control means, for varying the pressure in said fluid spring, including a switching means and an actuator means adapted to act on said switching means; a belt winding mechanism disposed on one of said base and seat carrier frames and including a belt having first and second ends, the first end of said belt being secured to and windable on said belt winding mechanism and the second end of said belt being secured to the other of said base and seat carrier frames, said control means being co-operable with said belt winding mechanism to produce relative rotary movement as between said switching means and said actuator in response to movement in respect of height of said seat carrier frame relative to said base frame.

2. A seat as set forth in claim 1 wherein said actuator comprises a cam shaft arrangement having a cam shaft operatively connected to said belt winding mechanism for rotation thereby.

* * * * *